US011862059B2

(12) United States Patent
Kwon et al.

(10) Patent No.: US 11,862,059 B2
(45) Date of Patent: Jan. 2, 2024

(54) DISPLAY DEVICE AND OPERATING METHOD THEREOF

(71) Applicant: SAMSUNG ELECTRONICS CO., LTD., Suwon-si (KR)

(72) Inventors: Taeksu Kwon, Suwon-si (KR); Dongwook Suh, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/693,961

(22) Filed: Mar. 14, 2022

(65) Prior Publication Data

US 2022/0366826 A1 Nov. 17, 2022

(30) Foreign Application Priority Data

May 11, 2021 (KR) ........................ 10-2021-0060684

(51) Int. Cl.
*G09G 3/20* (2006.01)

(52) U.S. Cl.
CPC ....... *G09G 3/20* (2013.01); *G09G 2300/0814* (2013.01); *G09G 2310/027* (2013.01); *G09G 2310/08* (2013.01)

(58) Field of Classification Search
CPC ....... G09G 2330/021; G09G 2330/028; G09G 2320/0276; G09G 2320/0673; G09G 2320/0626; G09G 2320/0233; G09G 3/3696; G09G 3/20; G09G 3/3233; G09G 3/3688; G09G 3/3611; G09G 2360/16; G09G 2310/027; G09G 2310/08
See application file for complete search history.

(56) References Cited

U.S. PATENT DOCUMENTS

| | | | | |
|---|---|---|---|---|
| 9,514,264 | B1 * | 12/2016 | Nebesnyi | H01L 27/0207 |
| 2002/0030652 | A1 * | 3/2002 | Shibata | G09G 3/3611 345/87 |
| 2009/0040158 | A1 * | 2/2009 | Chuang | G09G 3/2011 345/87 |
| 2011/0149146 | A1 * | 6/2011 | Yun | G09G 3/3648 348/790 |
| 2013/0135362 | A1 | 5/2013 | Kim et al. | |
| 2016/0335986 | A1 | 11/2016 | Bae et al. | |
| 2017/0270863 | A1 | 9/2017 | Suh et al. | |
| 2020/0029475 | A1 | 1/2020 | Park et al. | |
| 2020/0365090 | A1 | 11/2020 | Yoon et al. | |

FOREIGN PATENT DOCUMENTS

| | | | |
|---|---|---|---|
| JP | 2020-166287 | A | 10/2020 |
| KR | 10-2016-0095531 | A | 8/2016 |

* cited by examiner

*Primary Examiner* — Dong Hui Liang
(74) *Attorney, Agent, or Firm* — Sughrue Mion, PLLC

(57) ABSTRACT

A display device includes a first gamma line providing a first gamma voltage; a second gamma line providing a second gamma voltage; a local tab point line; a first switch configured to connect the first gamma line to the local tab point line based on a tab division enable signal; and a second switch configured to connect the second gamma line to the local tab point line based on the tab division enable signal.

20 Claims, 15 Drawing Sheets

100

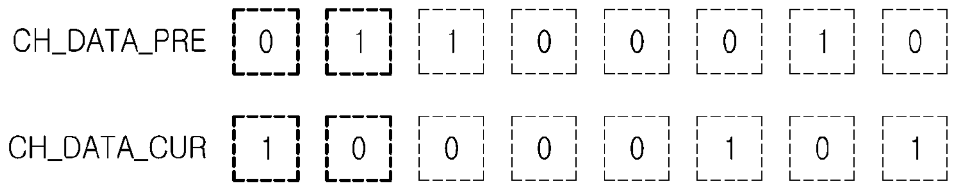
FIG. 7A
| MSB Change Criteria | L/R Change Channel # |
|---|---|
| 0 | 0 |
| 1 | 180 |
| 2 | 360 |
| 3 | 540 |
| 4(Default) | 720 |
| 5 | 1080 |
| 6 | 1260 |
| 7 | 1440 |
FIG. 7B
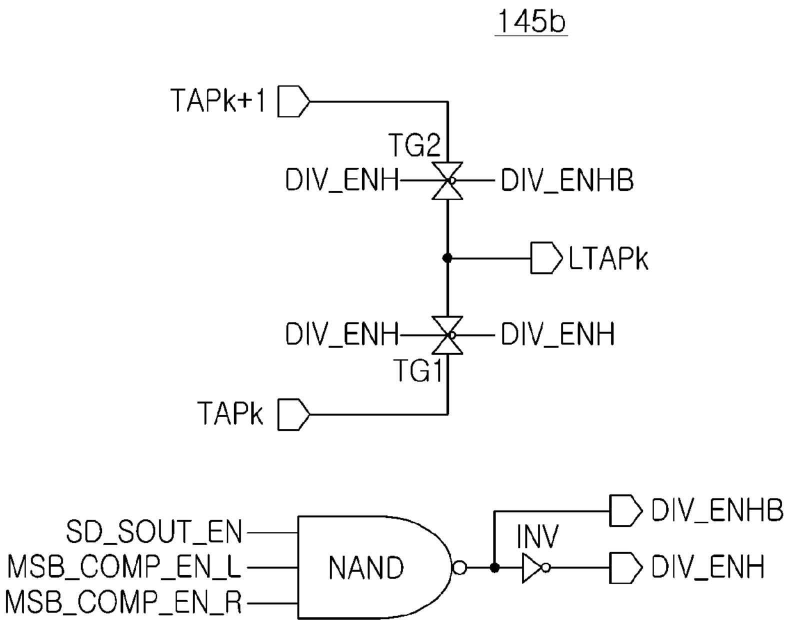
FIG. 8A

DISPLAY DEVICE AND OPERATING METHOD THEREOF

CROSS-REFERENCE TO RELATED APPLICATION(S)

This application claims priority to Korean Patent Application No. 10-2021-0060684 filed on May 11, 2021 in the Korean Intellectual Property Office, the disclosure of which is incorporated by reference herein in its entirety.

BACKGROUND

The present application relates to a display device and an operating method thereof.

In general, display devices include a display panel displaying an image and a display driving circuit driving the display panel. The display driving circuit may receive image data from an external host and apply an image signal corresponding to the received image data to a source line of the display panel to thereby drive the display panel.

SUMMARY

One or more example embodiments provide a display device for rapidly settling a gamma voltage and an operating method thereof.

One or more example embodiments also provide a display device for reducing additional current consumption, while settling a gamma voltage, and an operating method thereof.

According to an aspect of an example embodiment, there is provided a display device including: a first gamma line providing a first gamma voltage; a second gamma line providing a second gamma voltage; a local tab point line; a first switch configured to connect the first gamma line to the local tab point line based on a tab division enable signal; and a second switch configured to connect the second gamma line to the local tab point line based on the tab division enable signal.

According to an aspect of an example embodiment, there is provided a display device including: a gamma voltage generator configured to generate gamma voltages; at least one first source driver provided on a left side of the gamma voltage generator and configured to connect a first gamma line of a plurality of first gamma lines corresponding to the gamma voltages to a corresponding first source channel based on first data; at least one second source driver provided on a right side of the gamma voltage generator and configured to connect a second gamma line of a plurality of second gamma lines corresponding to the gamma voltages to a corresponding second source channel based on second data; a first tab division switch block connected to the plurality of first gamma lines; and a second tab division switch block connected to the plurality of second gamma lines, wherein each of the first tab division switch block and the second tab division switch block includes: a first switch configured to connect the first gamma line to a local tab point line in response to a tab division enable signal; and a second switch configured to connect the second gamma line to the local tab point line in response to the tab division enable signal.

According to an aspect of an example embodiment, there is provided a method of operating a display device, the method including: detecting a data pattern by comparing previous line data with current line data; and generating a local tab between gamma lines based on the detected data pattern.

BRIEF DESCRIPTION OF DRAWINGS

The above and other aspects, features, and advantages of the present disclosure will be more clearly understood from the following detailed description, taken in conjunction with the accompanying drawings, in which:

FIGS. 7A and 7B are views illustrating an operation of data comparison logic according to example embodiments;

FIGS. 8A and 8B are views illustrating a fast gamma settling circuit 145*b* and an operation timing diagram thereof according to another example embodiment;

DETAILED DESCRIPTION

Hereinafter, example embodiments will be described clearly and in detail using the drawings to the extent that those of skilled in the art may easily implement the present disclosure.

Figure 1:
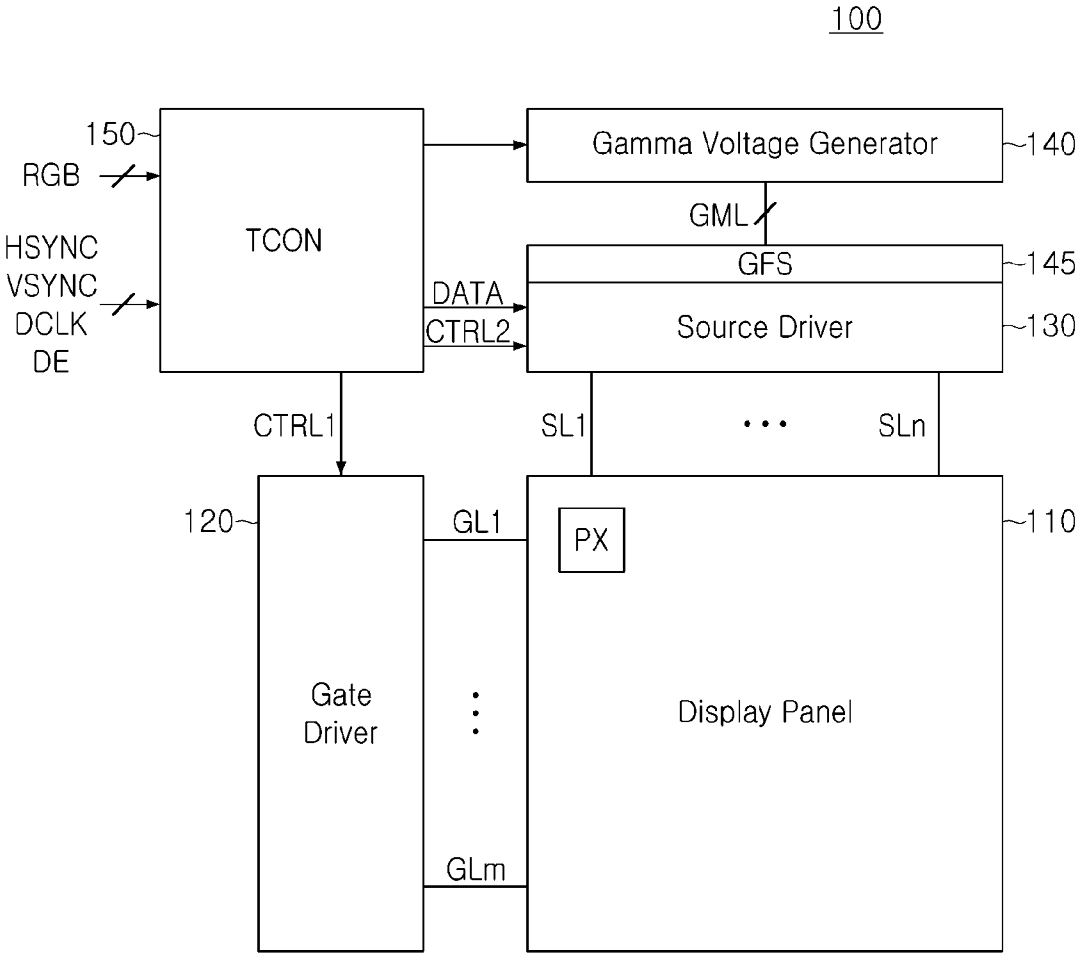
FIG. 1 is a block diagram illustrating a display device according to example embodiments.

FIG. 1 is a block diagram illustrating a display device 100 according to example embodiments. Referring to FIG. 1, the display device 100 may include a display panel 110, a gate driver 120, a source driver 130, a gamma voltage generator 140, a fast gamma settling circuit (GFS) 145, and a timing controller 150.

The display panel 110 may include a plurality of pixels PXs arranged in a matrix form. In an embodiment, the display panel 110 may be implemented to display an image in units of frames. For example, the display panel 110 may be implemented as one of a liquid crystal display (LCD), a light emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD), and may also be implemented as other types of flat panel displays or flexible displays.

As shown in FIG. 1, the display panel 110 may include gate lines GL1 to GLm (m is an integer of 2 or greater) arranged in a row direction, source lines SL1 to SLn (n is an integer of 2 or greater) arranged in a column direction, and pixels PX formed at intersections of the gate lines GL1 to GLm and the source lines SL1 to SLn. In an embodiment, some of pixels, connected to the same gate line, having different colors, and being adjacent to each other may be configured as a unit pixel. Here, each of some pixels of the unit pixel may be referred to as a sub-pixel.

The gate driver 120 is implemented to select gate lines GL1 to GLm by supplying a scan clock (or a gate-ON signal) to the gate lines GL1 to GLm in response to a first control signal CTRL1 provided from the timing controller 150.

In an embodiment, one of the gate lines GL1 to GLm may be selected according to the scan clock output from the gate driver 120. A display operation may be performed by applying a pixel signal (or an image signal) corresponding to each of the pixels to the pixels of a horizontal line corresponding to the selected gate line through the source lines SL1 to SLn. A source line may also be referred to as a source channel. In an embodiment, the gate lines GL1 to GLm may be selected sequentially or non-sequentially.

The source driver 130 may be implemented to convert image data into pixel signals, which are analog signals, (e.g., grayscale voltages or currents corresponding to each pixel data) in response to a second control signal CTRL2 and provide the pixel signals to the source lines SL1 to SLn to drive the source lines SL1 to SLn. For example, the source driver 130 may charge the source lines SL1 to SLn based on the pixel signals. The source driver 130 may provide pixel signals of one line to the source lines SL1 to SLn during one horizontal driving period. Thereafter, when the scan clock is provided, the source driver 130 may provide pixel signals to pixels of a horizontal line corresponding to the selected gate line through the source lines SL1 to SLn.

The source driver 130 may include a plurality of amplifiers. In an embodiment, each of the plurality of amplifiers may provide a pixel signal to at least one corresponding source line. Here, the amplifier may be referred to as a channel amplifier or a source amplifier. In an embodiment, some of the plurality of amplifiers may be turned off and others may be turned on according to pixel data. Here, some amplifiers which are turned on may drive two source lines.

The timing controller 150 may be implemented to control an overall operation of the display device 100. For example, the timing controller 150 may receive image data RGB and timing signals (e.g., a horizontal synchronization signal HSYNC, a vertical synchronization signal VSYNC, a clock signal DCLK, and a data enable signal DE) from an external device (e.g., a host device) and generate the first control signal CTRL1 and the second control signal CTRL2 for controlling the source driver 130 and the gate driver 120 based on the received pixel data RGB and timing signals, respectively.

The gamma voltage generator 140 may be implemented to generate and output gamma voltages corresponding to the image data RGB. In an embodiment, the gamma voltage generator 140 may generate gamma voltages in a voltage division manner. In an embodiment, the gamma voltage generator 140 may output gamma voltages to a plurality of corresponding gamma lines GML.

The fast gamma settling circuit 145 may be implemented to quickly settle a gamma voltage corresponding to each of the gamma lines GML.

In addition, the timing controller 150 may convert a format of the image data RGB received from the outside to match an interface specification with the source driver 130 and transmit the converted image data to the source driver 130. For example, the converted image data may include packet data.

The display device 100 may further include an interface circuit. The interface circuit may be implemented to communicate with an external device, e.g., a host processor, and receive the image data RGB and timing signals from the external device. In an embodiment, the interface circuit may include one of an RGB interface, a CPU interface, a serial interface, a mobile display digital interface (MDDI), an inter integrated circuit (I2C) interface, a serial peripheral interface (SPI), and a micro controller unit (MCU) interface, a mobile industry processor interface (MIPI), an embedded display port (eDP) interface, a D-subminiature (D-sub), an optical interface, or a high definition multimedia interface (HDMI). The interface circuit may include various serial or parallel interfaces in addition.

In FIG. 1, the gate driver 120, the source driver 130, the gamma voltage generator 140, the fast gamma settling circuit 145, and the timing controller 150 are illustrated as different functional blocks. In an embodiment, the respective components may be implemented as different semiconductor chips. In another embodiment, at least two of the gate driver 120, the source driver 130, the gamma voltage generator 140, the fast gamma settling circuit 145, and the timing controller 150 may be implemented as one semiconductor chip. For example, the source driver 130 and the timing controller 150 may be integrated into one semiconductor chip. Also, some components may be integrated on the display panel 110. For example, the gate driver 120 may be integrated on the display panel 110.

Figure 2A:
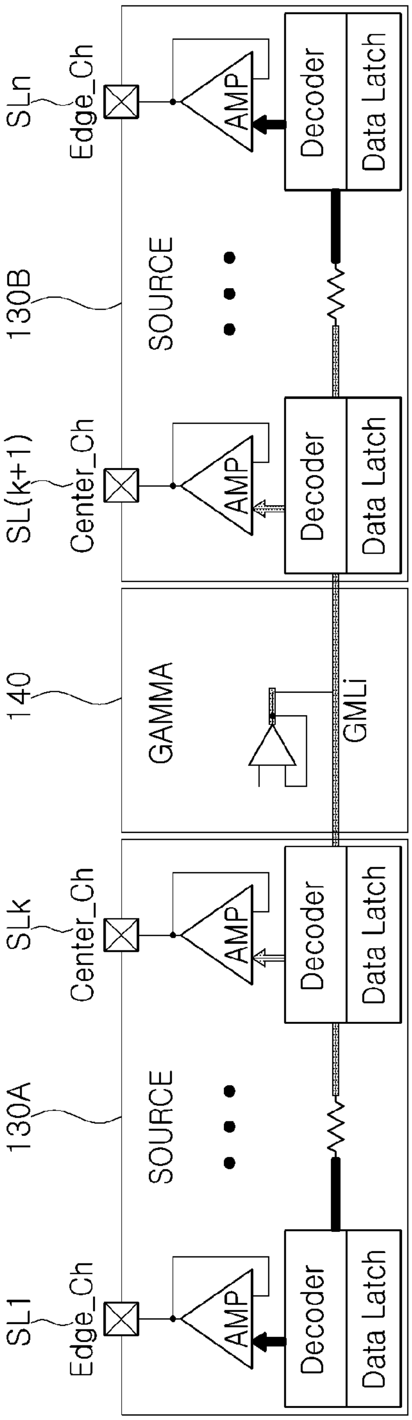
FIG. 2A illustrates a source driver configured as two source drivers side-by-side, according to example embodiments.

FIG. 2A illustrates source driver 130 of FIG. 1 configured as side-by-side source drivers 130A and 130B. Gamma voltage generator 140 provides gamma voltages to 130A and 130B. 130A and 130B are fed DATA and CTRL2 from the TCON, similar to FIG. 1. The DATA is latched in buffers referred to as "Data Latch" in FIG. 2A. The output of each Data Latch feeds a Decoder. Each Decoder feeds an amplifier which places a gamma voltage onto a source line. Four example source lines are shown in FIG. 2A, those being SL1, SLk, SL(k+1) and SLn.

Figure 2B:
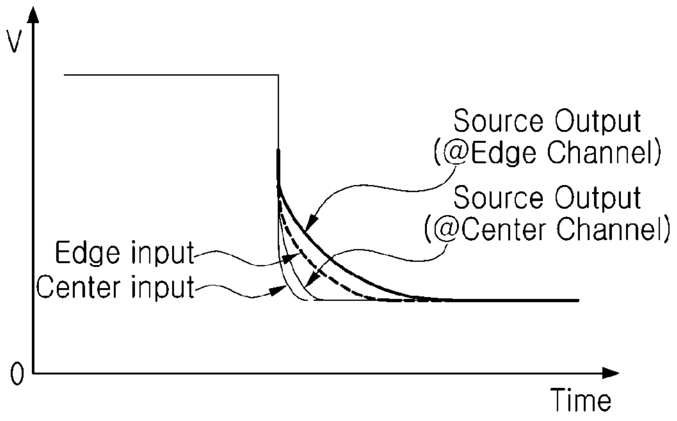
FIG. 2B illustrates a settling time of a gamma line of a general display device, according to example embodiments.

FIG. 2B illustrates a settling time of a gamma line of a general display device.

In general, a 1-line pixel charging time of the panel continuously decreases for high-frequency and high-resolution display driving. In addition, a larger number of source channels are required in a DDI to support high resolution. The increase in the number of source channels increases a gamma load, thereby slowing the settling time of the gamma line. This may deteriorate the settling time of the source line, which may cause problems in a fast operation.

A gamma line of the source channel structurally farthest from the gamma voltage generator is the slowest point in settling due to an RC delay. As a fast driving technique, a fast slew technique for improving output slewing characteristics of the source amplifier AMP may be used. Even if such a fast slew technique is used, as shown in FIG. 2B, if gamma settling is slow, a gamma settling time is a bottleneck of a source settling time due to an input delay of the source amplifier AMP. Therefore, it is necessary to improve the gamma settling time in order to improve the characteristics of an IC output settling time in a situation where support for high frequency and high resolution is continuously required.

Figure 3:
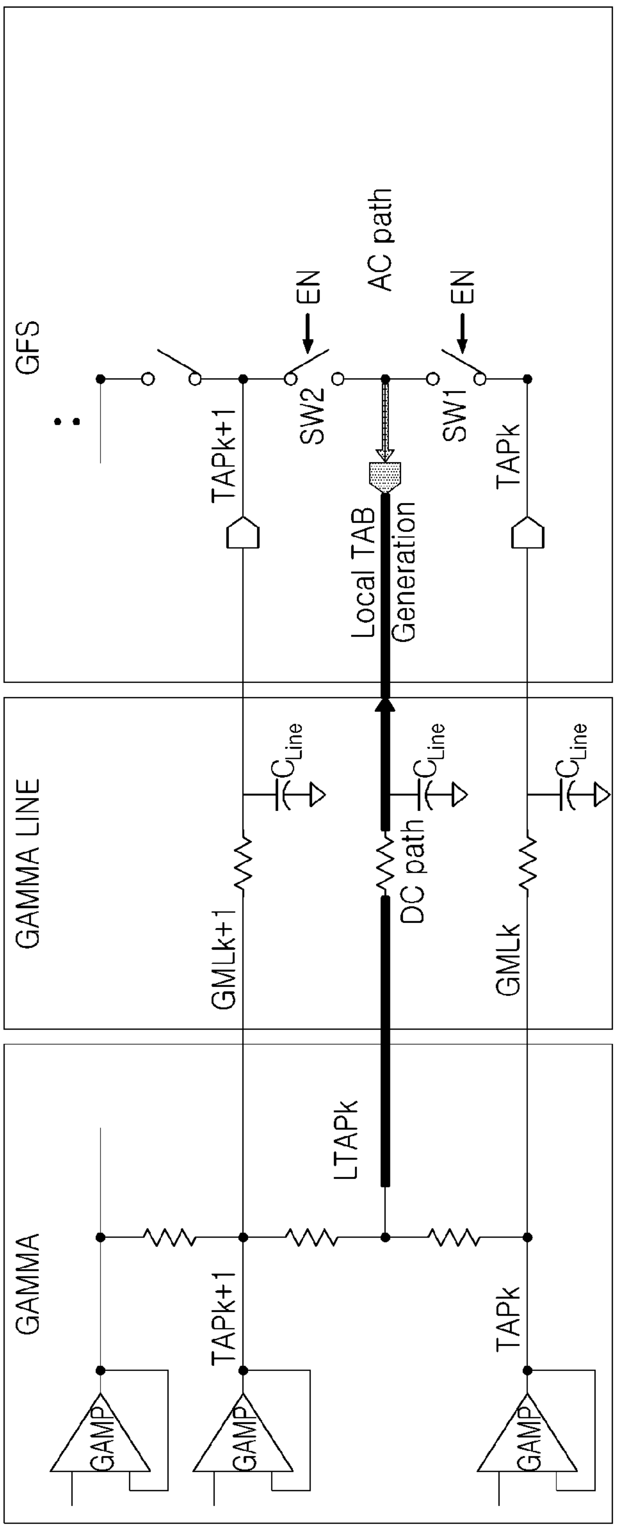
FIG. 3 is a view illustrating the concept of a fast gamma settling circuit (GFS) according to example embodiments.

FIG. 3 is a view illustrating a concept of a fast gamma settling circuit GFS according to example embodiments.

Referring to FIG. 3, the fast gamma settling circuit GFS may include switches SW1 and SW2 connected in series between gamma tab point lines TAPk and TAPk+1. A tab voltage is a boost voltage to speed arrival of a gamma source line at a proper value. Here, the gamma tab point lines TAPk and TAPk+1 may correspond to gamma lines GMLk and GMLk+1. The first switch SW1 may be connected between the gamma tab point line TAPk and a local gamma tab line LTAPk. The second switch SW2 may be connected between the gamma tab point line TAPk+1 and the local gamma tab line LTAPk. In an embodiment, the first and second switches SW1 and SW2 may be turned on in response to a GFS enable signal EN. That is, in response to the GFS enable signal EN, the fast gamma settling circuit GFS may generate a local tab. Here, the generated local tab may generate a high-speed AC path. A local tab point line may also be referred to herein as a local boost line.

The switches SW1 and SW2 may receive voltages from the gamma tab point lines TAPk and TAPk+1, respectively. At a timing at which each switch is turned on, a local tab voltage may be generated through resistance division using a resistance component of the switch.

Also, the k-th tab point line TAPk and the (k+1)-th tab point line TAPk+1 may be resistor-divided in the gamma voltage generator. A resistor-divided local tab point line LTAPk may generate a low-speed DC path. As mentioned above, a local tab point line may also be referred to herein as a local boost line.

Figure 4:
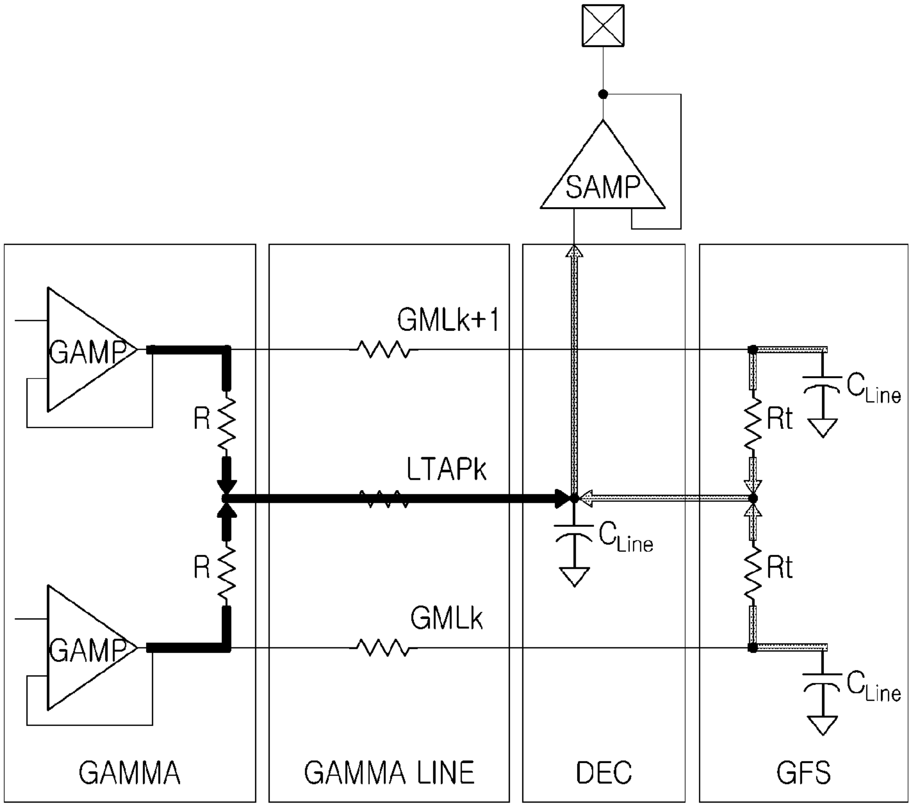
FIG. 4 is a view illustrating a voltage settling path using a fast gamma settling circuit (GFS) according to example embodiments.

FIG. 4 is a view illustrating a voltage settling path using a fast gamma settling circuit GFS according to example embodiments.

Referring to FIG. 4, a gamma line path when a settling path and a settling function are used is illustrated. In existing techniques, a unidirectional settling path is formed in a gamma block. In the case of using the settling function, a high-speed AC path may be generated by dividing a value of a DC voltage stored in a parasitic capacitance CLINE of a line using a low impedance resistance Rt of a switch. That is, in addition to the existing settling DC path, an additional settling-related AC path may be generated. Settling time characteristics of the gamma line may be improved through the DC path and the AC path.

Here, the reason for using a switch rather than a resistor to generate a local tab voltage is to reduce a static current according to the use of a resistor through timing control. When such a timing control operation is performed, it is possible to prevent an offset from occurring due to mismatch of the switch resistance in the process of voltage distribution using the switch. Referring to ON/OFF timing control of the switch, the switch may be set, by a register, to be turned on at a point where gamma fluctuation according to data updating occurs. After the ON-timing operation, an OFF-timing operation may be performed. Here, since the switch ON/OFF operation is performed at a time of data change, additional current consumption may be minimized in an operation corresponding to gamma settling and panel charging current.

In general, when the amount of data change is large, an operation corresponding to a dynamic current generated at the time of driving the panel is included, so that additional current consumption of the GFS may be minimized. However, when data such as a monochromatic pattern is maintained without a change, a phenomenon in which consumption current increases due to an additional dynamic current caused by a switch "ON/OFF" operation may occur. Thus, a data comparison method may be applied to prevent an increase in current consumption according to the operation of the GFS in a pattern with a small data change.

Figure 5A:
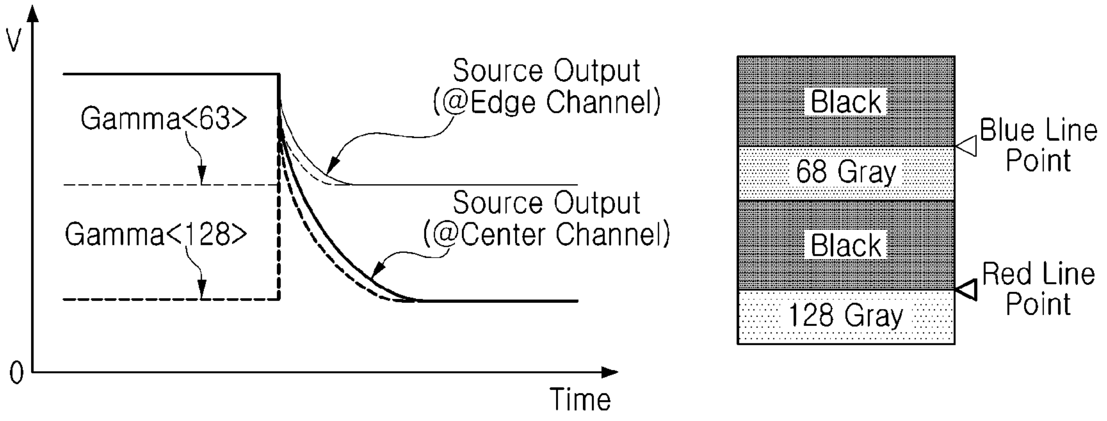
FIGS. 5A, 5B, and 5C are views illustrating embodiments to which a data comparison method of a fast gamma settling circuit is applied.
Figure 5B:
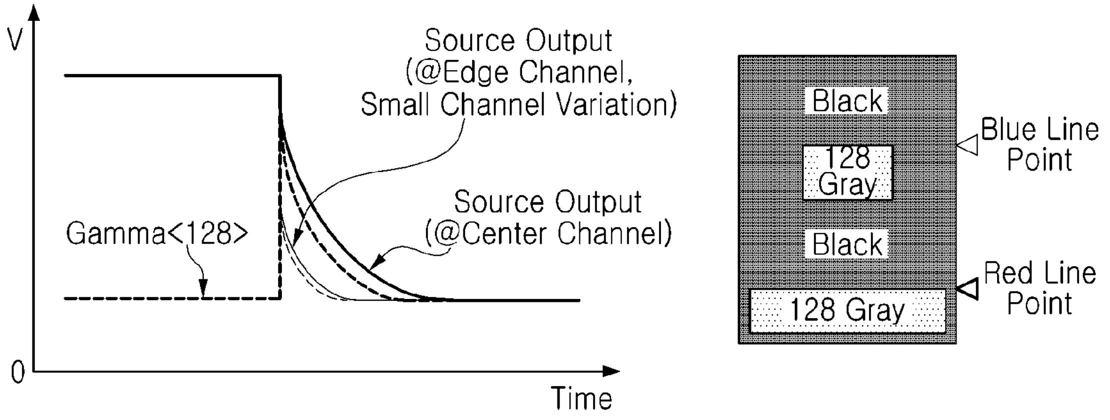
Figure 5C:
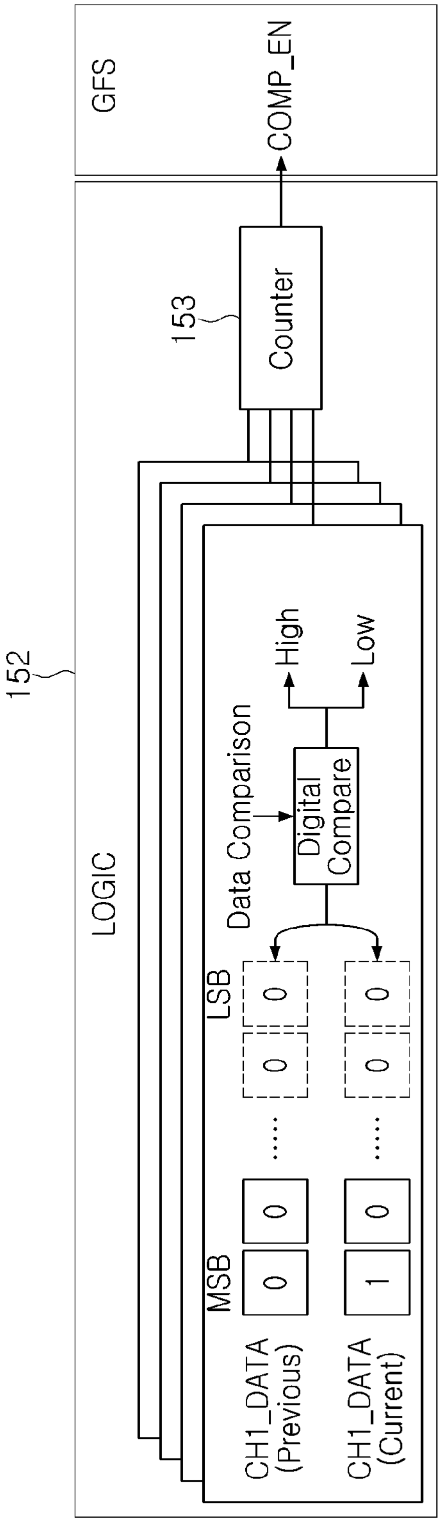

FIGS. 5A, 5B, and 5C are views illustrating embodiments to which a data comparison method of a fast gamma settling circuit is applied.

FIG. 5A is a symbolic representation of a screen display in which same-intensity values span the entire screen and change at specific line points. As shown in FIG. 5A, when the amount of data change of the channel is large (red line point), a fluctuation of gamma is significantly generated. Accordingly, a source output is also slowed by an input delay of the source amplifier. Considering this the function of the GFS may be activated when the amount of data change is large. FIG. 5A illustrates pixel intensity values "black," "68 gray", "black," and "128 gray."

In addition, as shown in FIG. 5B, when there are many data changing channels (red line point, "128 Gray" does not span all channels) than when there are few data changing channels (blue line point, "128 Gray" spans almost all channels), gamma fluctuation increases due to an increase in a load required for settling. Accordingly, a delay of the gamma settling time is increased. In consideration of the characteristics of FIGS. 5A and 5B, when the amount of data change is large as shown in FIG. 5C, a change in data of the most-significant 2 bits of each channel may be detected. Accordingly, the amount of data change of each channel may be checked. Meanwhile, it should be understood that data change detection is not limited to the most-significant 2 bits of each channel. FIG. 5B illustrates pixel intensity values "black," "128 gray", "black," and "128 gray."

A data comparison logic 152 may compare previous channel data with current channel data, determine a gravity (high/low) of the amount of a data change according to a comparison result, count the number of channels with the large amount of data change by a counter 153, and generate a GFS enable signal COMP_EN when a count value is greater than a reference value.

Figure 6A:
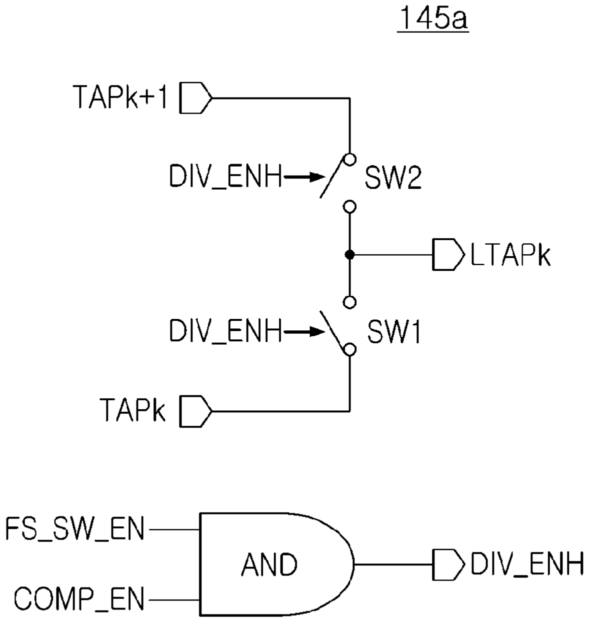
FIG. 6A is a view illustrating a fast gamma settling circuit of a data comparison method according to example embodiments.
Figure 6B:
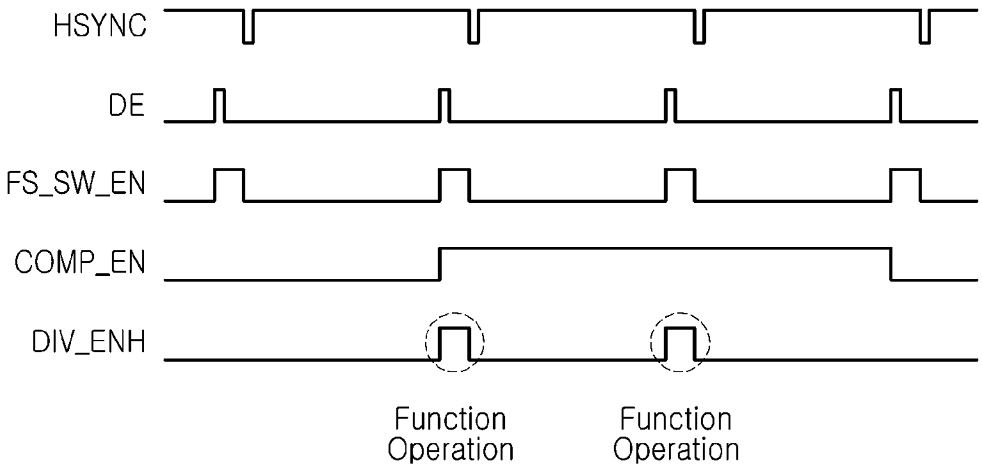
FIG. 6B is a timing diagram of a fast gamma settling circuit according to example embodiments.

FIG. 6A is a view illustrating a fast gamma settling circuit 145*a* of a data comparison method according to example embodiments, and FIG. 6B is a timing diagram of the fast gamma settling circuit 145*a* according to example embodiments.

Referring to FIG. 6A, the fast gamma settling circuit 145*a* may include a first switch SW1, a second switch SW2, and a logic circuit AND. The logic circuit AND may generate a tab division enable signal DIV_ENH by performing a logical operation on the GFS enable signal COMP_EN and a switch signal FS_SW_EN. The first switch SW1 and the second switch SW2 may be turned on in response to the tab division enable signal DIV_ENH.

Data may be updated in response to a data update signal DE, and data may be transmitted to each source channel in response to a horizontal synchronization signal HSYNC. When the count value of the changed number of channels exceeds a reference value, the GFS enable signal COMP_EN has a high level as shown in FIG. 6B. When the GFS enable signal COMP_EN has a high level, the switch signal FS_SW_EN determining an ON/OFF timing of the switches SW1/SW1 may turn on the switches SW1/SW2 of the GFS during a high level timing. When the tab division enable signal DIV_ENH has a high level, a functional operation (a gamma fast settling operation) of the GFS may be performed.

The fast gamma settling circuit 145*a* of the data comparison method described above may control the GFS operation according to data patterns, thereby preventing an occurrence of an unnecessary dynamic current.

FIGS. 7A and 7B are views illustrating an operation of data comparison logic according to example embodiments. In an embodiment, the source drivers may be divided into two left and right groups to be applied. In an embodiment, whether there is a change in an (N−1)-th line data CH_DATA_PRE and an N-th line data CH_DATA_CUR of the most-significant 2 bits of the source channel may be checked. When the number of channels in which there is a change in data of the most-significant 2 bits is greater than the number (e.g., 720) of channels set as registers, the GFS function may be operated.

Meanwhile, the switch of the fast gamma settling circuit may be implemented as a transmission gate.

Figure 8B:
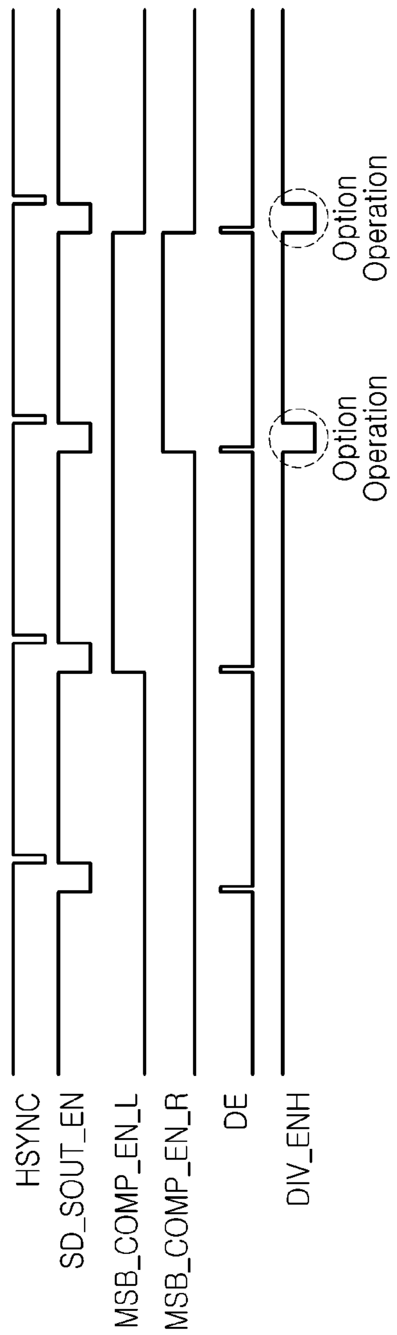

FIGS. 8A and 8B are views illustrating a fast gamma settling circuit 145*b* and a timing diagram thereof according to another embodiment.

Referring to FIG. 8A, the fast gamma settling circuit 145*b* includes a first transmission gate TG1, a second transmission gate TG2, a first logic circuit NAND, and a second logic circuit INV.

The first transmission gate TG1 may be connected between a first tab point line TAPk and a local tab point line LTAPk in response to a tab division enable signal DIV_ENH and an inverted tab division enable signal DIV_ENHB. The second transmission gate TG2 may be connected between the second tab point line TAPk+1 and the local tab point line LTAPk in response to the tab division enable signal DIV_ENH and the inverted tab division enable signal DIV_ENHB.

The first logic circuit NAND may perform a first operation on a source output enable signal SD_SOUT_EN, a left most-significant bit comparison signal MSB_COMP_EN_L, and a right most-significant bit comparison signal MSB_COMP_EN_R to generate an inverted tab division enable signal DIV_ENHB. The second logic circuit INV may invert the inverted tab division enable signal DIV_ENHB to generate a tab division enable signal DIV_ENH.

As shown in FIG. 8B, when both the left most-significant bit comparison signal MSB_COMP_EN_L and the right most-significant bit comparison signal MSB_COMP_EN_R have high levels, the tab division enable signal (DIV_ENH) has a low level for a predetermined time in response to the data enable signal DE.

The fast gamma settling circuit 145*b* according to example embodiments may branch a gamma line (gamma tab point) in routing to a gamma to source driver. In the fast gamma settling circuit 145*b*, a switch may be positioned between adjacent tab voltages, thereby making a ½ voltage of a first voltage of the first tab point line TAPk and a second voltage of the second tab point line TAPk+1 and providing the ½ voltage to a center gamma line.

Figure 9:
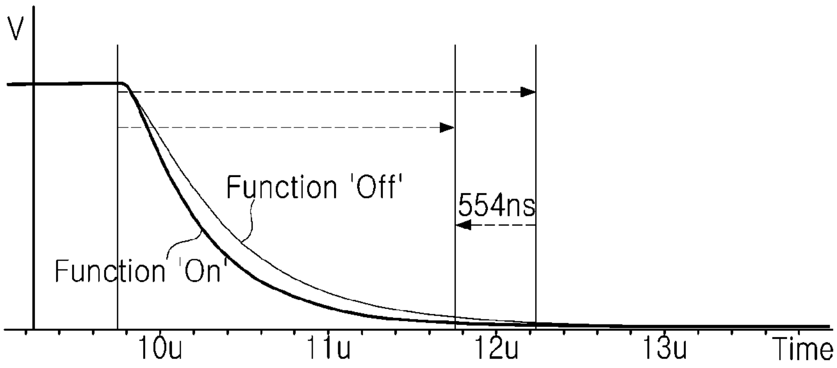
FIG. 9 is a view comparing simulation waveforms of a related art display device and a display device according to example embodiments.

FIG. 9 is a view comparing simulation waveforms of the related art display device and a display device according to example embodiments. The x-axis of the graph in FIG. 9 is marked with time units of 10*u*, 11*u*, 12*u* and 13*u*.

Referring to FIG. 9, in the case of using the worst gamma pattern such as a source output waveform, a settling time of approximately 554 ns (improvement rate: 22%) may be improved.

Thereby, it is possible to satisfy the same source characteristics at a high frequency of 22%. Therefore, the improvement of the settling time of 22% may have an effect of satisfying the same characteristics as the source characteristics of the worst settling pattern of 120 Hz even at 144 Hz. In the case of GFS, it is a method of improving a settling speed by directly generating a voltage using a switch, in which a peak level of a gamma voltage change according to a data change is lower than that of the related art, exhibiting the best characteristics at an initial speed.

The fast gamma settling circuit according to example embodiments may be variously disposed inside the DDI. Hereinafter, the fast gamma settling circuit of some embodiments is described as a tab division switch block in the DDI.

Figure 10:
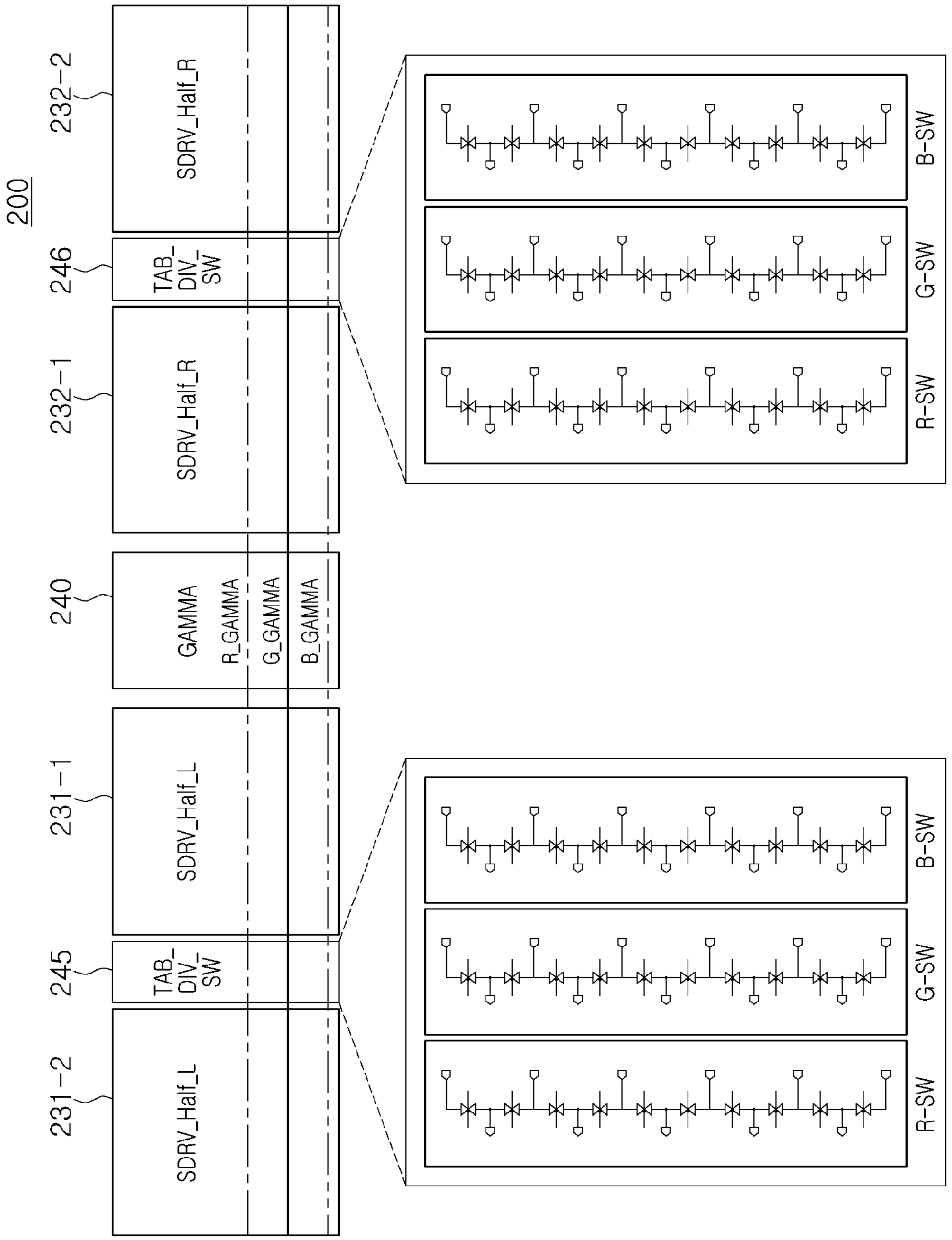
FIG. 10 is a view illustrating a position of a tab division switch block according to example embodiments.

FIG. 10 is a view illustrating a position of a tab division switch block of a display device 200 according to example embodiments. Referring to FIG. 10, two source drivers 231-1 and 231-2 may be disposed on the left of the left gamma voltage generator 240 and two source drivers 232-1 and 232-2 may be disposed on the right of the left gamma voltage generator 240. A tab division switch block TAB_DIV_SW 245 may be disposed between the two source drivers 231-1 and 231-2 and a tab division switch block TAB_DIV_SW 246 may be disposed between the two source drivers 232-1 and 232-2.

In an embodiment, the tab division switch block 245 or 246 may include a first switch block R-SW corresponding to a red gamma R_GAMMA, a second switch block R-SW corresponding to a green gamma G GAMMA, and a third switch block B-SW corresponding to a blue gamma B_GAMMA.

In an embodiment, each of the first switch block R-SW, the second switch block G-SW, and the third switch block B-SW may include a plurality of transmissions gates connected in series for tab division.

Figure 11:
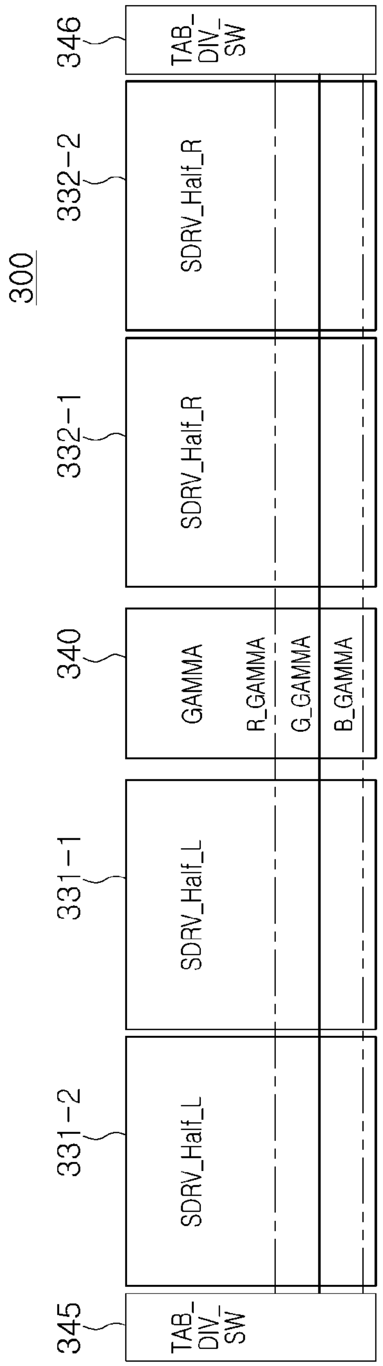
FIG. 11 is a view illustrating a position of a tab division switch block according to example embodiments.

FIG. 11 is a view illustrating a position of a tab division switch block of a display device 300 according to example embodiments. Referring to FIG. 11, two source drivers 331-1 and 331-2 may be disposed on the left of a gamma voltage generator 340 and two source drivers 332-1 and 332-2 may be disposed on the right of the gamma voltage generator 340. Tab division switch blocks TAB_DIV_SW 345 and 346 may be disposed on the edges of the left and right source drives 331-1 and 331-2 and 332-1 and 332-2, compared with those illustrated in FIG. 10.

In FIGS. 10 and 11, tab division switch blocks are disposed in all of the red gamma R_GAMMA, green gamma G GAMMA, and blue gamma B_GAMMA. However, embodiments are not limited thereto. In some embodiments, the tab division switch block may be disposed in at least one of the red gamma R_GAMMA, green gamma G GAMMA, and blue gamma B_GAMMA.

Figure 12:
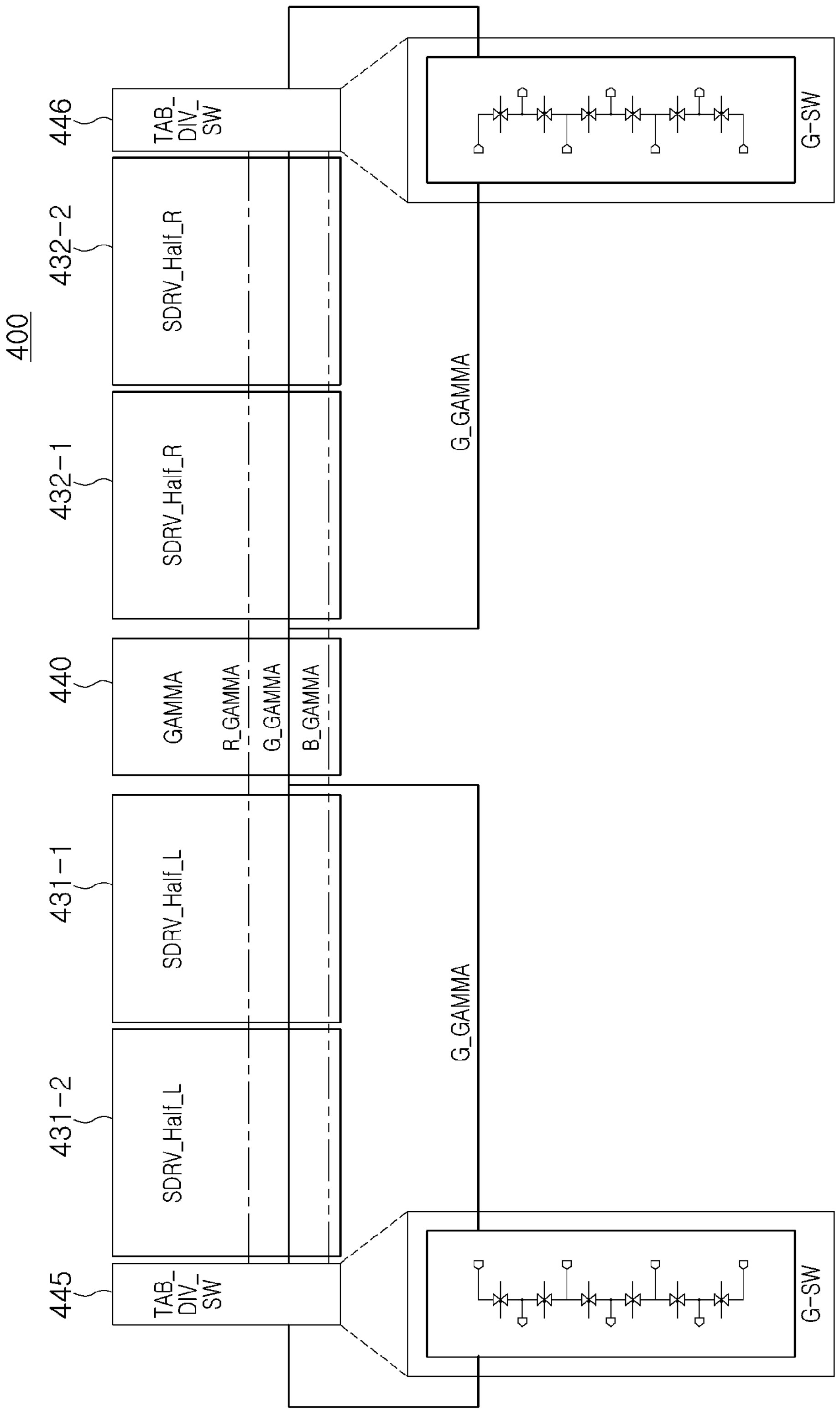
FIG. 12 is a view illustrating a position of a tab division switch block according to example embodiments.

FIG. 12 is a view illustrating a position of a tab division switch block of a display device 400 according to example embodiments. Referring to FIG. 12, two source drivers 431-1 and 431-2 may be disposed on the left of the gamma voltage generator 440 and two source drivers 432-1 and 432-2 may be disposed on the right of the gamma voltage generator 440. Tab division switch blocks TAB_DIV_SW 445 and 446 may be disposed only in green gamma G GAMMA, compared to that shown in FIG. 11.

Figure 13:
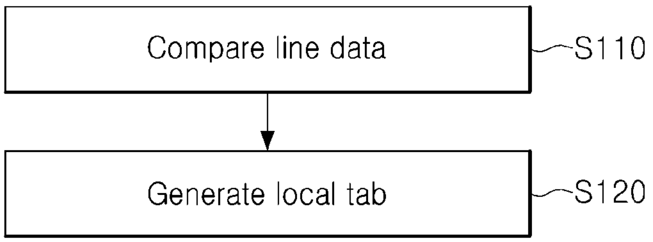
FIG. 13 is a flowchart illustrating a method of operating a display device according to example embodiments.

FIG. 13 is a flowchart illustrating a method of operating a display device according to example embodiments. Referring to FIG. 13, the display device may operate as follows.

Previous line data CH_DATA_PRE (see FIG. 7A) provided to the display panel 110 of each channel (see FIG. 1) may be compared with current line data CH_DATA_CUR to be provided to the display panel 110 (S110). A local tab may be generated between the gamma lines by enabling the fast gamma settling circuit according to a data pattern or the number of variable channels as a comparison result (S120).

Figure 14:
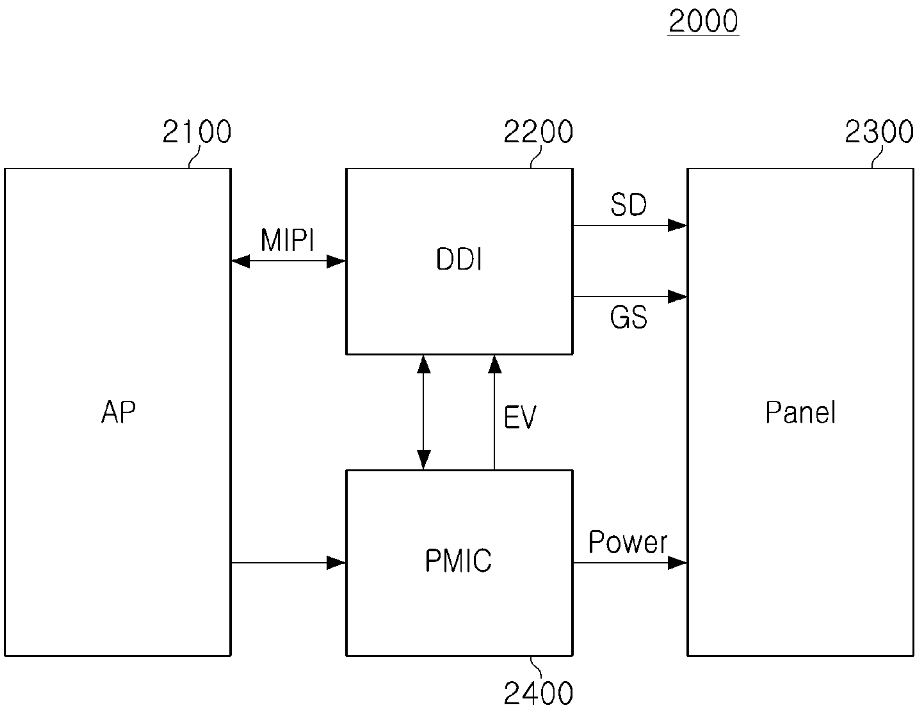
FIG. 14 is a view illustrating an electronic device according to example embodiments.

FIG. 14 is a view illustrating an electronic device 2000 according to example embodiments. Referring to FIG. 14, the electronic device (or a mobile device) 2000 may include a processor AP 2100, a display driving circuit DDI 2200, a panel 2300, and a power circuit PMIC 2400.

The processor 2100 may be implemented to control an overall operation of a display device. In an embodiment, the processor 2100 may be implemented as an integrated circuit, a system on a chip, or a mobile application processor (AP). The processor 2100 may transmit data to be displayed (e.g., image data, video data, or still image data) to the display driving circuit 2200. In an embodiment, data may be classified as source data SD units corresponding to horizontal lines (or vertical lines) of the display panel 2300.

The display driving circuit 2200 may change the data transmitted from the processor 100 into a form that may be transmitted to the display panel 2300, and transmit the changed data to the display panel 2300. The source data SD may be supplied in units of pixels.

Also, the display driving circuit 2200 may be implemented as the fast gamma settling circuit or may include a tab division switch block described above with reference to FIGS. 1 to 13.

The processor interface may interface signals or data exchanged between the processor 2100 and the display driving circuit 2200. The processor interface may interface source data SD (line data) transmitted from the processor 2100 and transmit the interfaced source data to the display driving circuit 2200. In an embodiment, the processor interface may be an interface related to a serial interface such as a mobile industry processor interface (MIPI), a mobile display digital interface (MDDI), a display port, or an embedded display port (eDP).

The display panel 2300 may display the source data SD provided by the display driving circuit 2200 using gate signals GS.

The power circuit 2400 may be implemented to manage power of the display device. In an embodiment, the power circuit 2400 may include a power management integrated circuit (PMIC), a charger integrated circuit (IC), or a battery or fuel gauge. Also, the power circuit 2400 may have a wired and/or wireless charging method. The wireless charging method may include, for example, a resonant magnetic coupling method, an inductive coupling method, or an electromagnetic wave method, and may further include an additional circuit for wireless charging, for example, a coil loop, a resonance circuit, or a rectifier.

The power circuit 2400 may receive a command from the processor 2100 and supply power to each part of the display device. The power circuit 2400 may supply power to each of the display driving circuit 2200 and the display panel 2300. For example, the power circuit 2400 may provide an external voltage EV to the display driving circuit 2200. Here, the external voltage EV may be processed and used inside the display driving circuit 2200. The power interface may interface between the power circuit 2400 and the display driving circuit 2200. For example, the power interface may transmit commands that the display driving circuit 2200 transmits to the power circuit 2400. The power interface may exist separately from the processor interface. The display driving circuit 2200 may be directly connected to the power circuit 2400 without going through the processor 2100.

A dual source driver according to example embodiments may be applied to a foldable smartphone. In general, the foldable smartphone may be implemented in various foldable display types such as C-INFOLD, C+1, G, C-OUTFOLD, S, and the like. In general, the foldable smartphone may be classified into an in-fold structure and an out-fold structure according to a folding method.

As set forth above, the display device and the operating method thereof according to example embodiments may more rapidly settle a gamma voltage by performing tab division according to a data pattern.

The display device and the operating method thereof according to example embodiments may improve a settling time of a source output by rapidly settling a gamma voltage.

The display device and the operating method thereof according to example embodiments may prevent additional power consumption due to gamma tab division by performing tab division through data comparison.

The display device and the operating method thereof according to example embodiments do not cause a static current by improving a settling timing of gamma routing using timing control.

While example embodiments have been shown and described above, it will be apparent to those skilled in the art that modifications and variations could be made without departing from the scope of the present disclosure as defined by the appended claims.

What is claimed is:

1. A display device for display of image data comprising a plurality of lines, the display device comprising:
- a first gamma line providing a first gamma voltage;
- a second gamma line providing a second gamma voltage;
- a local tab point line configured to provide a boost voltage to speed arrival of the first gamma line to a predetermined value;
- a first switch configured to connect the first gamma line to the local tab point line based on a tab division enable signal at a first time for a first line of the plurality of lines of the image data; and
- a second switch configured to connect the second gamma line to the local tab point line based on the tab division enable signal at the first time for the first line of the plurality of lines of the image data.

2. The display device of claim 1, wherein the tab division enable signal is generated based on a comparison of previous line data with current line data.

3. The display device of claim 2, further comprising:
- a logic circuit configured to perform an AND operation on a high speed switch enable signal and a data comparison signal and to output the tab division enable signal,
- wherein the data comparison signal is generated based on a comparison of the previous line data with the current line data.

4. The display device of claim 3, wherein the data comparison signal is generated based on a difference between most-significant 2 bits of the previous line data and most-significant 2 bits of the current line data being equal to or greater than a reference value.

5. The display device of claim 2, further comprising:
- a semiconductor chip comprising configured to:
  - compare previous data with current line data associated with each source channel of a plurality of source channels,
  - count a first number of source channels of the plurality of source channels in which a difference between the previous data and the current line data is equal to or greater than a reference value, and
  - generate a data comparison signal based on the first number of source channels exceeding a threshold.

6. The display device of claim 5, wherein the reference value is 4, and the threshold is 720.

7. The display device of claim 2, further comprising:

a first logic circuit configured to perform a NAND operation on a source output enable signal, a left most-significant bit enable signal, and a right most-significant bit enable signal; and an inverter configured to invert an output value from the first logic circuit and output the tab division enable signal.

8. The display device of claim 1, wherein the first gamma voltage and the second gamma voltage are generated in a resistance division manner.

9. The display device of claim 1, wherein each of the first switch and the second switch comprises a transmission gate.

10. The display device of claim 1, further comprising a decoder configured to receive line data and to connect one of a plurality of gamma lines to a source channel corresponding to the line data.

11. A method of operating a display device for display of image data comprising a plurality of lines, the method comprising:

detecting a data pattern by comparing previous line data with current line data; and generating a local tab voltage between gamma lines based on the detected data pattern, wherein the local tab voltage is configured to provide a boost voltage to speed arrival of a first gamma line of the gamma lines to a predetermined value.

12. The method of claim 11, wherein the detecting the data pattern comprises:

counting a number of source channels in which a difference between the previous line data and the current line data is equal to or greater than a reference value; and generating a tab division enable signal based on the number of source channels exceeding a threshold, and wherein the local tab voltage is generated based on the tab division enable signal.

13. The method of claim 12, wherein the local tab voltage corresponds to at least one of a red gamma voltage, a green gamma voltage, and a blue gamma voltage.

14. The method of claim 11, wherein the detecting the data pattern comprises comparing at least one most-significant bit of the previous line data with at least one most-significant bit of the current line data.

15. The method of claim 11, wherein the detecting the data pattern comprises generating a tab division enable signal based on a difference between the previous line data and the current line data being equal to or greater than a reference value, and the local tab voltage is generated based on the tab division enable signal.

16. A display device comprising:

a gamma voltage generator configured to generate gamma voltages;

at least one first source driver provided on a left side of the gamma voltage generator and configured to connect a first gamma line of a plurality of first gamma lines corresponding to the gamma voltages to a corresponding first source channel based on first data;

at least one second source driver provided on a right side of the gamma voltage generator and configured to connect a second gamma line of a plurality of second gamma lines corresponding to the gamma voltages to a corresponding second source channel based on second data;

a first tab division switch block connected to the plurality of first gamma lines; and a second tab division switch block connected to the plurality of second gamma lines, wherein each of the first tab division switch block and the second tab division switch block comprises:

a first switch configured to connect the first gamma line to a local tab point line in response to a tab division enable signal; and a second switch configured to connect the second gamma line to the local tab point line in response to the tab division enable signal.

17. The display device of claim 16, wherein each of the at least one first source driver and the at least one second source driver comprises two half source drivers, and each of the first tab division switch block and the second tab division switch block is provided between the two half source drivers.

18. The display device of claim 16, wherein each of the at least one first source driver and the at least one second source driver comprises two half source drivers, and each of the first tab division switch block and the second tab division switch block is provided outside the two half source drivers.

19. The display device of claim 16, wherein each of the first tab division switch block and the second tab division switch block comprises:

a first switch block corresponding to a red gamma voltage;

a second switch block corresponding to a green gamma voltage; and a third switch block corresponding to a blue gamma voltage.

20. The display device of claim 16, wherein each of the first tab division switch block and the second tab division switch block comprises one of a first switch block corresponding to a red gamma voltage, a second switch block corresponding to a green gamma voltage, and a third switch block corresponding to a blue gamma voltage.

* * * * *